United States Patent [19]
Pfeffermann

[11] 3,851,158
[45] Nov. 26, 1974

[54] METHOD AND APPARATUS FOR DERIVING THE MEAN VALUE OF THE PRODUCT OF A PAIR OF ANALOG QUANTITIES

[75] Inventor: Jan Zaruba Pfeffermann, Prague, Czechoslovakia

[73] Assignee: Ceske Vysoke Uceni Technicke, Stavebni Ustav, Prague, Czechoslovakia

[22] Filed: June 29, 1973

[21] Appl. No.: 374,932

[52] U.S. Cl............................ 235/150.52, 235/194
[51] Int. Cl.............................................. G06g 7/16
[58] Field of Search ...... 235/194, 195, 196, 150.52, 235/150.3; 340/347 A–347 D; 328/160, 161; 307/229

[56] References Cited
UNITED STATES PATENTS

| | | | |
|---|---|---|---|
| 3,510,772 | 5/1970 | Luthi............................. | 235/194 X |
| 3,525,042 | 8/1970 | Nunlist et al. ................. | 235/194 X |
| 3,605,028 | 9/1971 | De Vries......................... | 235/194 X |
| 3,648,182 | 3/1972 | Carnel ........................... | 235/194 X |
| 3,681,586 | 8/1972 | Kitaura.......................... | 235/194 X |

*Primary Examiner*—Joseph F. Ruggiero

[57] ABSTRACT

Each of a pair of time dependent input analog quantities is sampled at a predetermined rate, and the successive samples are encoded into first and second separate trains of binary pulses wherein the frequency of pulse occurrence of each train is dependent on the magnitude of the associated sample. The first and second trains of pulses are respectively combined with the output of a clock pulse generator to form third and fourth pulse trains. Each pulse occurrence at the output of the third pulse train coincides with a particular clock pulse that succeeds the occurrence of a pulse in the first pulse train; in like manner, each pulse occurrence at the output of the fourth pulse train coincides with a particular clock pulse that succeeds the occurrence of a pulse in the second pulse train. The third and fourth trains are combined in a coincidence circuit, and the total number of pulses occurring over a given interval at the output of the coincidence circuit are counted to yield an analog indication of the mean value of the product of the two input analog quantities over such interval.

7 Claims, 9 Drawing Figures

METHOD AND APPARATUS FOR DERIVING THE MEAN VALUE OF THE PRODUCT OF A PAIR OF ANALOG QUANTITIES

BACKGROUND OF THE INVENTION

Existing techniques for the statistical evaluation of a pair of time-varying analog quantities in many cases require the computation of the mean value of the product of the quantities over a prescribed interval of time. As is well-known, the resulting mean value may have significance, e.g. in determining the correlation of the respective quantities.

In known arrangements, while certain steps appropriate for such statistical evaluations can be accomplished in digital form, the apparatus that forms the product of the input analog quantities generally comprises analog devices that are slow acting. Moreover, in such systems instabilities frequently plague the conversion of the generated analog products into digital form for further processing. Where very high reliability is required, therefore, the formation of the product of the quantities would also have to be done in digital form, an operation which up to now has been complicated and expensive.

SUMMARY OF THE INVENTION

An improved technique for obtaining the mean value of the product of first and second time-variable analog quantities over a first interval while avoiding the problems indicated above is provided by the present invention. The first and second quantities are sampled, and the samples are separately converted into first and second trains of binary pulses. The respective frequencies of occurrence of the pulses in the two trains at any given time are dependent on the magnitudes of the corresponding amplitude samples of the associated analog quantities.

The first and second pulse trains are individually translated into third and fourth trains of pulses derived from a clock pulse generator and so timed that (a) each pulse in the third train coincides with a particular clock pulse period after the occurrence of each pulse in the first pulse train and (b) each pulse in the fourth train coincides with a particular clock pulse period after the occurrence of a pulse in the second pulse train. In one embodiment, the next succeeding clock pulse period is used. In another embodiment, the Nth succeeding clock pulse period (N being an integer) is used when the polarity of the corresponding input analog quantity is positive and the (N + 1)th succeeding clock pulse period is used when such quantity is negative.

The third and fourth pulse trains are combined to produce a fifth train of pulses, each of which represents a coincidence in time of the pulses in the respective third and fourth trains.

The number of pulse occurrences in the fifth pulse train are counted during the first interval. The number of pulses so counted is proportional to the mean value of the product of the first and second analog quantities over such interval.

If desired, suitable discrete time delays of selected multiples of the clock pulse period may be introduced between the third and fourth pulse trains as an aid in cross-correlation studies and the like.

BRIEF DESCRIPTION OF THE DRAWING

The invention will be further set forth in the following detailed description taken in conjunction with the appended drawing, in which.

DETAILED DESCRIPTION

Figure 1:
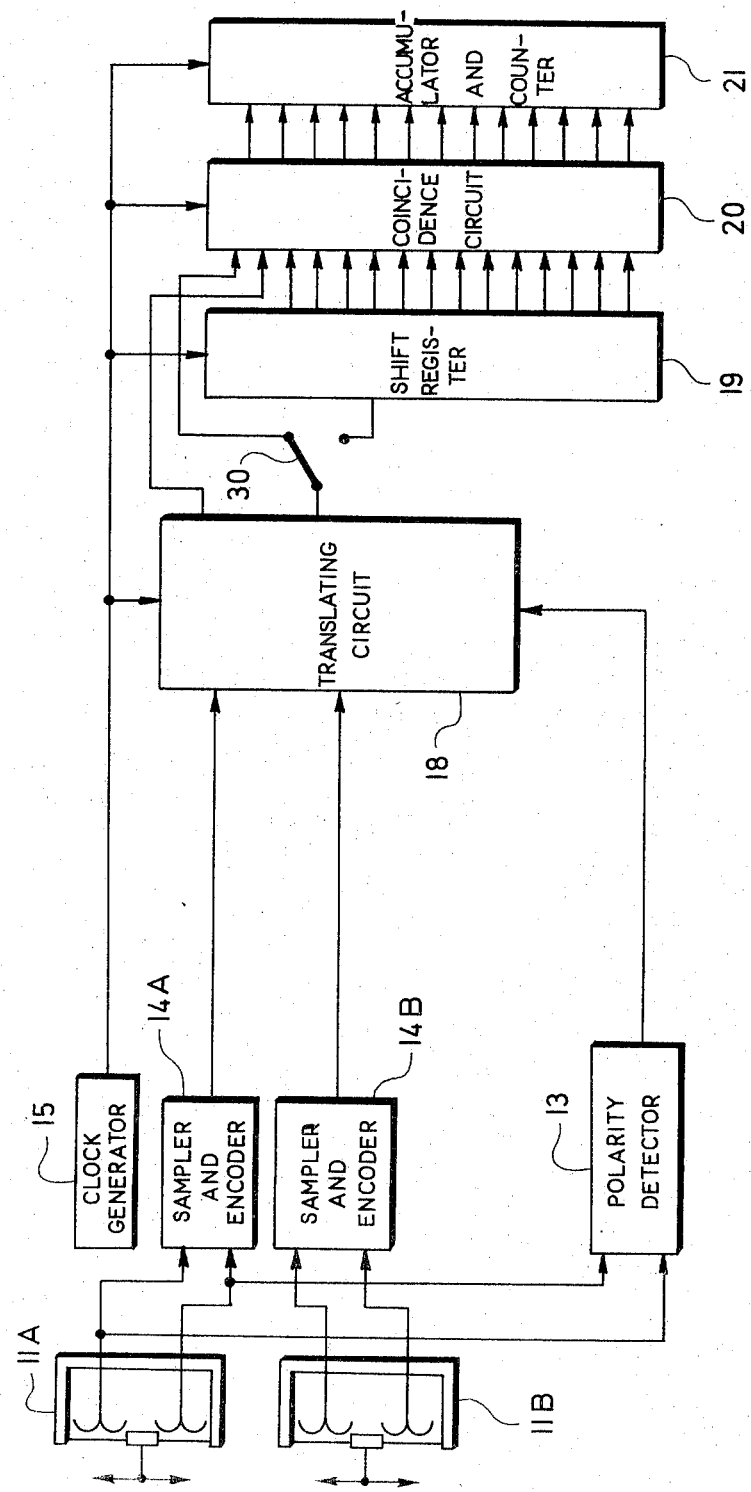
FIG. 1 is a block diagram of an arrangement for deriving the mean value of a product of a pair of analog quantities by processing a succession of pulse trains in accordance with FIGS. 2 – 6.
Figure 2A:
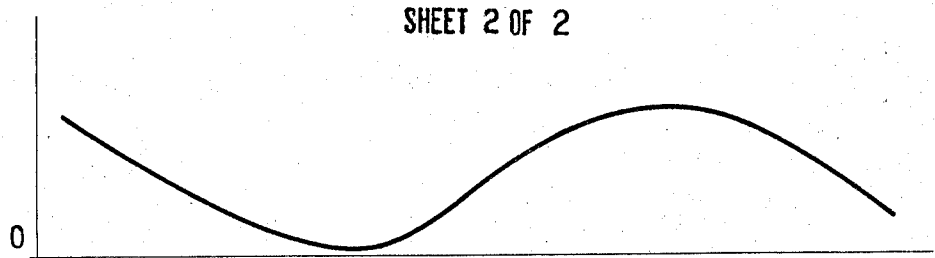
FIGS. 2A and 2B are curves respectively indicating a pair of time-varying analog quantities whose mean product is to be derived with the arrangement of FIG. 1.
Figure 2B:
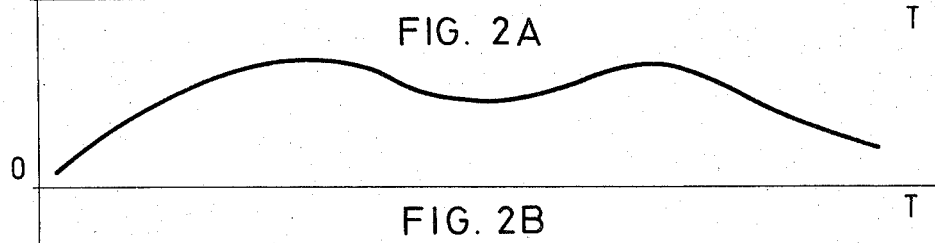

Referring now to the drawing, the scheme of FIG. 1 illustrates a pair of analog sensors 11A and 11B which illustratively may be arranged to detect the instantaneous acceleration of a structure (not shown) as a result of a predetermined wind or pressure load applied thereto. The outputs of the sensors 11A and 11B are time varying analog quantities whose characteristics over a prescribed interval T are shown in FIGS. 2A and 2B, respectively; In general, the polarity of the output of the sensors may be positive or negative, although in each case only a positive polarity is shown over the interval T.

The outputs of the sensors 11A and 11B are applied to the inputs of sampling and encoding circuits 14A and 14B, respectively. The output of the sensor 11A is also coupled to a polarity detector 13 for purposes to be explained.

Figure 3A:
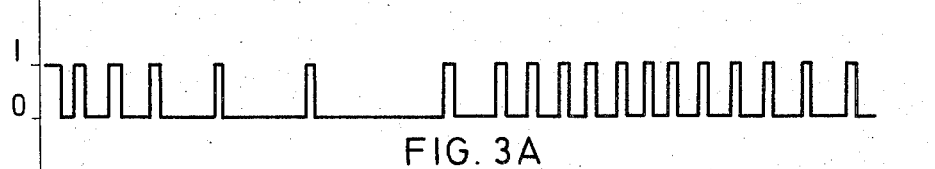
FIGS. 3A and 3B are curves showing a pair of pulse trains whose pulse occurrence frequency is modulated in accordance with the corresponding amplitude samples of the respective analog quantities of FIGS. 2A and 2B.

Each of the circuits 14A and 14B is provided with suitable facilities for sampling the analog input from the associated sensor 11A or 11B at a regular rate during the interval T, and for encoding such samples in binary form to define a train of pulses the occurrences of which are varied in accordance with the periodic amplitude samples derived from each of the input quantities. In particular, each sample derived from the analog quantity of FIG. 2A by the circuit 14A is converted to a train of pulses such as is shown in FIG. 3A, wherein the frequency of pulse occurrence at any given portion of the interval T is proportional to the amplitude of the corresponding amplitude sample of the curve of FIG. 2A during such portion. Similarly, the circuit 14B provides at its output a train of pulses shown in FIG. 3B wherein the frequency of pulse occurrence is proportional to the amplitude of the corresponding samples of the curve of FIG. 2B.

Figure 3B:
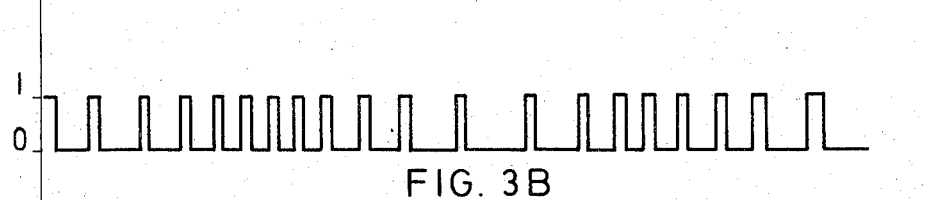
Figure 4:
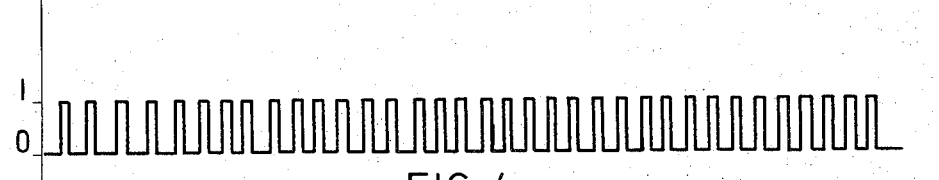
FIG. 4 is a curve showing a train of clock pulses.
Figure 5A:
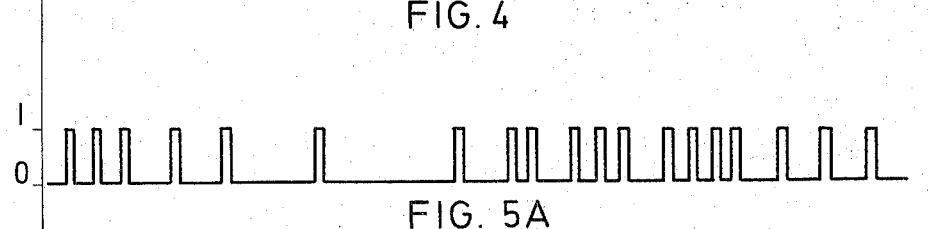
FIGS. 5A and 5B are curves of a pair of translated pulse trains derived respectively from the pulse trains of FIGS. 3A and 3B.
Figure 5B:
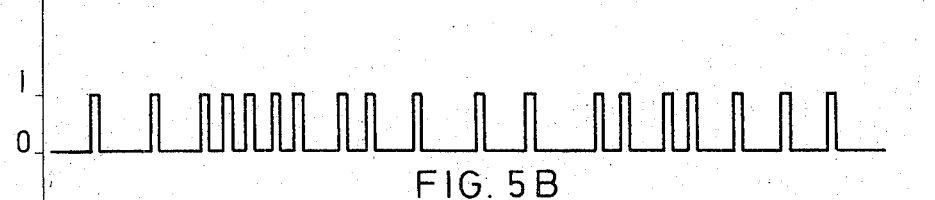

The outputs of the circuits 14A and 14B are applied to the input of a translating circuit 18, which is controlled by a regularly recurring train of clock pulses (FIG. 4) from a suitable generator 15. The pulse trains applied to the circuit 18 are translated into modified pulse trains which exhibit a pulse during a prescribed clock pulse period that follows an occurrence of a pulse in the input train to be translated. The translated pulse trains corresponding to the input pulse trains of FIGS. 3A and 3B are shown in FIGS. 5A and 5B, respectively. The prescribed period may be selected, as shown, to be the next succeeding clock pulse period.

The pulse train shown in FIG. 5A is directly coupled from one output of the translating circuit 18 to one input of a coincidence circuit 20. The pulse train shown in FIG. 5B is coupled from another output of the circuit 18 to a second input of the coincidence circuit through a first illustrated position of a switch 30. The output of the coincidence circuit responds to each coincidence of pulses in the translated pulse trains of FIGS. 5A and 5B to form a final pulse train indicated in FIG. 6.

Figure 6:
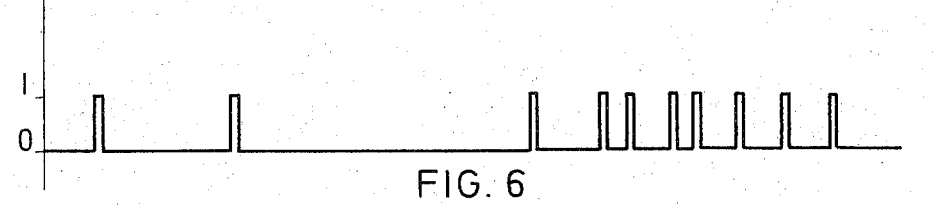
FIG. 6 is a curve of a pulse train resulting from each coincidence of the pulses in the trains of FIGS. 5A and 5B.

The output of the coincidence circuit 20 is applied to an accumulator counter 21 which counts the total number of pulses in the pulse train of FIG. 6 over the interval T. The total count established in the counter 21 is an analog indication of the mean value of the product of the analog quantities of FIGS. 2A and 2B over the interval T.

The processing scheme indicated above is readily adaptable to cross-correlation studies wherein, e.g., one of the input analog quantities is compared with time-delayed replicas of the other analog quantity. In previous statistical evaluation systems, accurate time delays were difficult to obtain because of the instabilities and inaccuracies in the delay lines and other analog devices employed for this purpose. With the instant scheme, however, the introduction of time delays into one of the quantities (e.g. the second quantity shown in FIG. 2B) is easily accomplished by coupling the corresponding pulse train (FIG. 5B) at the output of the translating circuit 18 to a shift register 19 via a second position of the switch 30. The shift register, whose several outputs may be selectively coupled to the coincidence circuit 20, is controlled by the clock pulse generator 15 so that a desired delay of an integral number of clock pulse periods may be introduced to the train of FIG. 5B prior to its application to the coincidence circuit 20.

In another variation of the depicted arrangement, the output of polarity detector 13 is applied to an input of translating circuit 18, and the circuit 18 is provided with facilities for varying the clock pulse period into which each pulse of the translated pulse trains falls in accordance with the polarity of the corresponding input analog quantity. In particular, such facilities may illustratively delay each pulse in the train of FIG. 5A by N clock pulse periods (where N is an integer) when the polarity of the corresponding curve of FIG. 2A is positive, and by (N + 1) clock pulse periods when the polarity of such curve is negative (a similar variation may, of course, be introduced into the pulse train of FIG. 5B).

With this arangement, the instantaneous product of a portion of the circuit analog quantity and a correspondingly poled portion of the second analog quantity will be relatively delayed by an even number of clock pulse periods referred to the input of the coincidence circuit 20, while the product of dissimilarly poled portions of the first and second quantities will be relatively delayed by an odd number of clock pulse periods. Each of these conditions will, of course, be manifested by a different pattern of pulse coincidences at the output of the circuit 20. The value accumulates in the counter 21, and thus the mean value of the product, will be correspondingly varied.

In the foregoing, the invention has been described in connection with preferred arrangements thereof. Many variations and modifications will now occur to those skilled in the art. For example, it will be appreciated that for monitoring, testing, and further processing, suitable means may be introduced in the arrangement of FIG. 1 for recording and storing the input analog quantities and/or the several pulse trains. Additionally, the outputs of the sampling and encoding circuits 14 may be directly coupled if desired to the inputs of coincidence circuit 20 without intermediate translator via the circuit 18. It is accordingly desired that the scope of the appended claims not be limited to the specific disclosure herein contained.

What is claimed is:

1. Apparatus for generating a quantity proportional to the mean value of the product of first and second time-dependent analog quantities over a prescribed first interval, which comprises: first conversion means responsive to the first quantity for generating a first pulse train whose frequency of pulse occurrence during each portion of the first interval corresponds to the magnitude of an amplitude sample of the first quantity during said portion; second conversion means responsive to the second quantity for generating a second pulse train whose frequency of pulse occurrence during each portion of the first interval corresponds to the magnitude of an amplitude sample of the second quantity during said portion; means for generating a train of clock pulses; first means responsive to the output of the first conversion means and the clock pulse generating means for generating a third pulse train each pulse occurrence of which coincides with a particular clock pulse period succeeding a pulse occurrence in the first pulse train; second means responsive to the outputs of the second conversion means and to the clock pulse generating means for generating a fourth pulse train each pulse occurrence of which coincides with a particular clock pulse period succeeding a pulse occurrence in the second pulse train;

means responsive to the outputs of the third and fourth pulse train generating means for generating a fifth pulse train that exhibits a pulse upon each coincidence of pulses in the third and fourth pulse trains; and means for counting the pulses of the fifth pulse train generated during the first interval, the resulting number of pulses representing the mean value of the product of the first and second quantities over said interval.

2. Apparatus as defined in claim 1, in which the apparatus further comprises means for detecting the instantaneous polarity of the first quantity and in which the third pulse train generating means further comprises, in combination, means responsive to the detection of a given polarity of the first quantity for exhibiting each pulse of the third pulse train during the Nth clock pulse period (Nth being an integer) after the occurrence of a pulse in the first pulse train, and means responsive to the detection of the opposite polarity of the first quantity for exhibiting each pulse of the third pulse train during the (N + 1)th clock pulse period after the occurrence of a pulse in the first pulse train.

3. Apparatus as defined in claim 1, further comprising a shift register coupled to the outputs of the clock pulse generating means and the fourth pulse train generating means for delaying the fourth pulse train by a prescribed number of clock pulse periods.

4. A machine method of generating a quantity proportional to the mean value of the product of first and second time-dependent analog quantities during a first time interval, the improvement which comprises the steps of:
  individually converting the first and second analog quantities into first and second trains of pulses, the density of the pulses in each such train during each portion of the first interval being related to the then-occurring instantaneous amplitude of the associated analog quantity;
  producing a separate train of clock pulses;
  generating a third pulse train each occurrence of which coincides with a clock pulse period succeeding each pulse in the first pulse train;
  generating a fourth pulse train each occurrence of which coincides with a clock pulse period succeeding each pulse in the second pulse train;
  producing a pulse upon each coincidence of pulses in the third and fourth pulse trains to define a fifth pulse train; and
  counting the number of pulse occurrences in the fifth pulse train that corresponded to the occurrence of pulses in the first and second pulse trains during the first interval, said number of pulse occurrences in the fifth pulse train being proportional to the mean value of the product of the first and second analog quantities.

5. A method as defined in claim 4, further comprising the step of delaying a selected one of the fourth and fifth pulse trains by a prescribed number of clock pulse periods with respect to the other of the last-mentioned pulse trains prior to the production of the fifth pulse train.

6. A method as defined in claim 4 in which each pulse occurrence in the third and fourth pulse trains coincides with the clock pulse period next succeeding a pulse of the associated first or second train.

7. A method as defined in claim 4, in which the method further comprises the step of determining the instantaneous polarity of the first analog quantity, in which each pulse occurrence in the third pulse train coincides with the Nth clock pulse period (N being an integer) after a pulse in the first pulse train whenever the associated first quantity has a given polarity, and in which each pulse occurrence in the third pulse train coincides with the (N + 1)th clock pulse period after a pulse in the first pulse train whenever the associated first quantity has the opposite polarity.

* * * * *